United States Patent
Hung et al.

(10) Patent No.: US 9,633,623 B2
(45) Date of Patent: Apr. 25, 2017

(54) DISPLAY DEVICE AND DISPLAY METHOD FOR DISPLAY DEVICE

(71) Applicant: Coretronic Corporation, Hsin-Chu (TW)

(72) Inventors: Wei-Lun Hung, Hsin-Chu (TW); Chih-Shin Hung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 26 days.

(21) Appl. No.: 14/751,148

(22) Filed: Jun. 26, 2015

(65) Prior Publication Data
US 2016/0133233 A1 May 12, 2016

(30) Foreign Application Priority Data
Nov. 10, 2014 (CN) .......................... 2014 1 0628341

(51) Int. Cl.
G09G 5/36 (2006.01)
G09G 5/00 (2006.01)
G06F 3/14 (2006.01)

(52) U.S. Cl.
CPC ............... *G09G 5/006* (2013.01); *G06F 3/14* (2013.01); *G09G 2370/12* (2013.01); *G09G 2370/20* (2013.01)

(58) Field of Classification Search
CPC .................................. G06G 5/395; G06T 1/60
See application file for complete search history.

(56) References Cited

U.S. PATENT DOCUMENTS

| | | | | |
|---|---|---|---|---|
| 8,713,213 B1* | 4/2014 | Yildiz | .................. | G06F 13/385 710/15 |
| 8,810,732 B1* | 8/2014 | Bozarth | .................. | H04N 5/268 348/555 |
| 2009/0079717 A1 | 3/2009 | Tsai | | |
| 2011/0022739 A1* | 1/2011 | Guillerm | ................ | G09G 5/006 710/18 |
| 2012/0027203 A1* | 2/2012 | Inada | .................... | H04L 9/0662 380/42 |
| 2013/0322461 A1 | 12/2013 | Poulsen | | |

* cited by examiner

*Primary Examiner* — Frank Chen
(74) *Attorney, Agent, or Firm* — Jianq Chyun IP Office

(57) ABSTRACT

A display device and a display method for the display device are provided. An image processing unit actively reads indicator bits stored in a receiving unit to determine whether the receiving unit receives an image signal. When it is determined that the receiving unit receives the image signal, the image processing unit enters a synchronous processing period to start receiving the image signal from the receiving unit.

12 Claims, 3 Drawing Sheets

DISPLAY DEVICE AND DISPLAY METHOD FOR DISPLAY DEVICE

CROSS-REFERENCE TO RELATED APPLICATION

This application claims the priority benefit of China application serial no. 201410628341.3, filed on Nov. 10, 2014. The entirety of the above-mentioned patent application is hereby incorporated by reference herein and made a part of this specification.

BACKGROUND

Technical Field

The invention relates to an electronic device, and particularly relates to a display device and a display method for a display device.

Related Art

A display device adopts different methods to play images of different image formats. In order to facilitate the display device correctly detecting an image format, conventionally a user has to manually adjust the display device to an appropriate play mode in order to ensure the display device to correctly play images. A known method for detecting a source of an image signal is to wait for each image input port of the display device for a predetermined time to detect whether there is an image signal inputted to the correct or corresponding input port. Because it is too long to wait for multiple or all of the image input ports for the predetermined time for detection, it is difficult to quickly and effectively find the image input port used for transmitting the image signal.

Patent application publications related to display devices include, for example, U.S. Patent Publication No. 20090079717 and 20130322461.

The information disclosed in this "BACKGROUND" section is only for enhancement understanding of the background of the invention and therefore it may contain information that does not form the prior art that is already known to a person of ordinary skill in the art. Furthermore, the information disclosed in this "BACKGROUND" section does not mean that one or more problems to be solved by one or more embodiments of the invention was acknowledged by a person of ordinary skill in the art.

SUMMARY

The invention is directed to a display device and a display method for a display device, which are capable of quickly detecting a source of an image signal to display images, so as to improve convenience of using the display device.

Other objects and advantages of the invention can be further illustrated by the technical features broadly embodied and described as follows.

In order to achieve one or a portion of or all of the objects or other objects, an embodiment of the invention provides a display device including a plurality of image input ports, a receiving unit, an image processing unit and a display unit. The receiving unit is coupled to the image input ports, and includes at least one register. The at least one register stores a plurality of indicator bits corresponding to the image input ports, where the indicator bits are adapted to indicate whether the receiving unit receives an image signal from the image input ports corresponding to the indicator bits. The image processing unit is coupled to the receiving unit, and is adapted to actively read the indicator bits stored in the at least one register to determine whether the receiving unit receives the image signal, and when the image processing unit determines the image input port used for transmitting the image signal to the receiving unit, and determines that the receiving unit receives the image signal, the image processing unit enters a synchronous processing period to start receiving the image signal from the receiving unit. The display unit is coupled to the processing unit, where the image processing unit is adapted to control the display unit to display according to the image signal.

In order to achieve one or a portion of or all of the objects or other objects, an embodiment of the invention provides a display method for a display device, which includes following steps. An image processing unit of the display device actively reads a plurality of indicator bits, where the indicator bits respectively correspond to a plurality of image input ports of the display device, and are stored in at least one register of a receiving unit of the display device, and the indicator bits indicate whether the receiving unit receives an image signal from the image input ports corresponding to the indicator bits. The image processing unit determines whether the receiving unit receives the image signal according to the indicator bits. When the image processing unit determines the image input port used for transmitting the image signal to the receiving unit, and determines that the receiving unit receives the image signal, the image processing unit enters a synchronous processing period to start receiving the image signal from the receiving unit. The image processing unit controls a display unit to display according to the image signal.

In an embodiment of the invention, when the image processing unit determines that the receiving unit does not receive the image signal from the image input port corresponding to a currently read indicator bit, the image processing unit continually and actively reads the indicator bits stored in the at least one register.

In an embodiment of the invention, the image processing unit is adapted to determine whether the image input port corresponding to a currently read indicator bit receives the image signal according to the currently read indicator bit. When the currently read indicator bit indicates that the image input port corresponding to the currently read indicator bit does not receive the image signal, the image processing unit determines whether the image input port corresponding to another indicator bit among the indicator bits receives the image signal according to the another indicator bit.

In an embodiment of the invention, when the image processing unit determines that a first image input port of the image input ports receives a first image signal at a first time, and determines that a second image input port of the image input ports receives a second image signal at a second time, the image processing unit controls the display unit to display according to the second image signal, where the second time is later than the first time.

In an embodiment of the invention, the image processing unit is adapted to notify the receiving unit to transmit the image signal to the image processing unit before the image processing unit receives the image signal during the synchronous processing period.

In an embodiment of the invention, the receiving unit is adapted to perform signal decryption and signal optimization to the image signal during the synchronous processing period.

In an embodiment of the invention, the image processing unit is adapted to receive a horizontal synchronous signal and a vertical synchronous signal of the image signal during the synchronous processing period.

According to the above descriptions, the image processing unit can actively read the indicator bits stored in the receiving unit to determine whether the receiving unit receives the image signal. In an embodiment of the invention, when determining that the receiving unit receives the image signal, the image processing unit enters the synchronous processing period to start receiving the image signal from the receiving unit. In this way, the source of the image signal is quickly detected to implement image display, so as to improve convenience of using the display device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
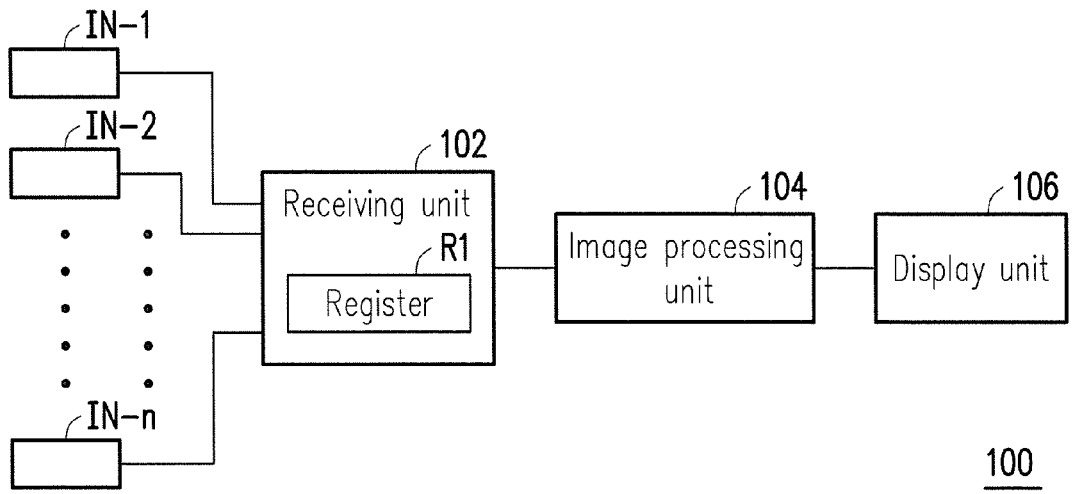
FIG. 1 is a schematic diagram of a display device according to an embodiment of the invention.

FIG. 1 is a schematic diagram of a display device according to an embodiment of the invention. Referring to FIG. 1, the display device 100 of the present embodiment includes a plurality of image input ports IN-1~IN-n, a receiving unit 102, an image processing unit 104 and a display unit 106, wherein n is a positive integer. In the embodiment of the invention, the display device 100 can be a projector. The receiving unit 102 is coupled to the image input ports IN-1~IN-n and the image processing unit 104, and the image processing unit 104 is coupled to the display unit 106. In the present embodiment, the receiving unit 102 is, for example, a frontend receiver IC such as a high definition multimedia interface receiver (HDMI receiver), an analog-to-digital converter (ADC), a video decoder, etc., and the image processing unit 104 is, for example, a digital light processing IC (DLP IC), a DLP application specific integrated circuit (DLP ASIC), a scaler IC or a formatter IC, etc. The display unit 106 includes, for example, a light valve, a prism, and/or a projection lens, though the invention is not limited thereto.

In the present embodiment, the image input ports IN-1~IN-n are respectively used for receiving an image signal with a specification complied with a specification of the applied image input port. The image input ports IN-1~IN-n are, for example, a digital visual interface (DVI) connector, a high definition multimedia interface (HDMI) connector, a video graphics array (VGA) connector, component ports, a composite video blanking sync/composite video baseband signal (CVBS) connector, an S-video, etc., which are respectively used for receiving the image signal with the corresponding specification. However, the invention is not limited thereto.

The receiving unit 102 of the present embodiment includes a register R1, which stores a plurality of indicator bits corresponding to the image input ports IN-1~IN-n, where the indicator bits indicate whether the receiving unit 102 receives an image signal from the image input ports corresponding to the indicator bits. In the present embodiment, although one register R1 is used to describe the display device 100, the number of the register R1 is not limited thereto, and in other embodiments, the receiving unit 102 may include a plurality of registers.

The image processing unit 104 can actively read the indicator bits stored in the register R1 to determine the image input port used for transmitting the image signal to the receiving unit 102 and determine whether the receiving unit 102 receives the image signal, which can be implemented by setting addresses of the indicator bits to correspond to the specific image input ports, though the invention is not limited thereto. In this way, the image processing unit 104 can actively read data stored in the receiving unit 102, so as to implement active detection on the receiving unit 102 by the image processing unit 104. For example, the indicator bit with a value of "1" represents that the receiving unit 102 receives the image signal from the image input port corresponding to the indicator bit, and the indicator bit with a value of "0" represents that the receiving unit 102 does not receive the image signal. In this way, when the image processing unit 104 reads the indicator bit with the value of "1", the image processing unit 104 not only can determine whether the receiving unit 102 stably provides the image signal used for displaying images, but also can determine the image input port corresponding to the image signal according to information of the indicator bit (for example, the address of the indicator bit). The image processing unit 104 then enters a synchronous processing period (which is described later), and receives the image signal from the image input port corresponding to the indicator bit, and controls the display unit 106 to display an image frame according to the image signal.

In one embodiment, it is assumed that the image input port has a state of frame stable when receiving a complete image signal, and the receiving unit 102 can store the state of frame stable into the register R1. When the image processing unit 104 actively reads the register R1 to learn the state of frame stable, the image processing unit 104 and the receiving unit 102 can synchronously perform respective operations. The aforementioned synchronous processing period refers to a period that the operation of the image processing unit 104 is synchronous to the operation of the receiving unit 102. The aforementioned frame stable is only an example. When the image signal is a HDMI signal, the state of frame stable can be replaced by transition minimized differential signalling (TMDS) clock stable, though the invention is not limited thereto.

In one embodiment, the image signal may at least include a horizontal synchronous signal, a vertical synchronous signal and a display image signal. After the image processing unit 104 enters the synchronous processing period, the image processing unit 104 starts to receive the image signal, and the backend display unit 106 displays image according to the image signal. However, during the synchronous processing period, before the image processing unit 104 of the present embodiment receives the display image signal, the image processing unit 104 can first receive the horizontal synchronous signal and the vertical synchronous signal to determine a start position of the display image signal. On the other hand, in one embodiment, while the image processing unit 104 enters the synchronous processing period to start receiving the image signal and make the backend display unit 106 to accordingly display an image frame, the receiving unit 102 performs signal decryption and/or signal optimization to the image signal, such as performs high bandwidth digital content protection (HDCP) decryption and/or compensates an attenuated signal by using an equalizer, and further transmits the decrypted and/or optimized image signal to the image processing unit 104.

In the present embodiment, the receiving unit 102 can start to transmit the image signal to the image processing unit 104 after receiving the image signal (for example, the HDMI signal, though the invention is not limited thereto), and in some embodiments, the image processing unit 104 can first notify the receiving unit 102 to transmit the image signal before receiving the image signal during the synchronous processing period, and then the receiving unit 102 starts to transmit the image signal to the image processing unit 104.

According to the above description, in the present embodiment, during the synchronous processing period, the operation that the receiving unit 102 performs the signal decryption and/or signal optimization to the image signal is synchronous to operations that the image processing unit 104 receives the image signal to perform image processing and controls the display unit 106 to accordingly display the image frame, which is different to the conventional technique that it has to wait for the receiving unit to complete performing the signal decryption and/or signal optimization to the image signal before the receiving unit transmits the image signal to the image processing unit so that the backend display unit can display images. Namely, in the conventional technique, the image processing unit cannot actively read/detect data in the receiving unit to determine a state of the image signal, instead, it has to wait for the receiving unit to complete all of the operations before the image processing unit receives and processes the image signal and the display unit performs display. In the conventional technique, since the waiting time of the receiving unit for the image signal corresponding to each of the image input ports is about several seconds, the waiting time of the receiving unit for the image signal corresponding to all of the image input ports is too long. However, referring to FIG. 1, in the display device 100 of the present embodiment, the image processing unit 104 can actively read the data in the register R1 without waiting for the receiving unit 102 to complete all of the operations. Therefore, the image processing unit 104 can receive the image signal from the receiving unit 102 earlier compared with the conventional technique, and control the display unit 106 to display the image frame, which can shorten a time of waiting for displaying the image frame.

In one embodiment, according to a currently read indicator bit (for example, an indicator bit corresponding to a DVI connection port), when the image processing unit 104 determines that the receiving unit 102 does not receive the image signal from the image input port corresponding to the indicator bit (for example, a value of the indicator bit corresponding to the DVI connection port is "0"), the image processing unit 104 continually reads another indicator bit (for example, an indicator bit corresponding to a HDMI connection port), and determines whether the receiving unit 102 receives the image signal from the image input port (i.e. the HDMI connection port). Deduced by analogy, the image processing unit 104 can continually read the indicator bit corresponding to each of the image input ports IN-1~IN-n until the image processing unit 104 determines that the receiving unit 102 receives the image signal from the image input ports IN-1~IN-n. The image processing unit 104 can read the indicator bits corresponding to the image input ports IN-1~IN-n according to a sequential reading method or a random reading method. In the aforementioned embodiment, the indicator bits are read from the register R1, however, the invention is not limited thereto, and in other embodiments, when the receiving unit 102 includes a plurality of registers, the image processing unit 104 can actively read the indicator bits from a plurality of the registers.

In the present embodiment, when the image processing unit 104 determines that the receiving unit 102 does not receive the image signal, the image processing unit 104 can immediately determine whether the receiving unit 102 receives the image signal from another image input port, such that the image processing unit 104 can quickly determine the image input port that provides the image signal, so as to reduce a waiting time of the user. In this way, the present embodiment can avoid the situation in the conventional technique that the image processing unit has to spend a period of predetermined time to passively wait for a notification from the receiving unit in order to learn from the receiving unit whether one of the image input ports receives the image signal and that only when the image processing unit learns from the receiving unit that the currently detected image input port does not receive the image signal, the receiving unit detects a next image input port. Therefore, in the conventional technique, since it has to wait for each of the image input ports for the predetermined time, a plenty of time is wasted.

In some embodiments, when the display unit 106 displays the image frame, the image processing unit 104 can continually and actively read the indicator bits corresponding to the image input ports IN-1~IN-n, where the image processing unit 104 can read the indicator bits corresponding to the image input ports IN-1~IN-n according to a sequential reading method or a random reading method. In an embodiment, the control display unit 106 determines a display frame according to the latest provided image signal. For example, it is assumed that the image processing unit 104 first determines that the receiving unit 102 receives the image signal from the DVI connection port at a time t1, and further determines that the receiving unit 102 receives the image signal from the HDMI connection port at a time t2, the image processing unit 104 controls the display unit 106 to display the image fame according to the image signal (i.e. the latest provided image signal) received from the HDMI connection port. Deduced by analogy, the image processing unit 104 determines that the receiving unit 102 receives the image signal from the image input port IN-1 at a first time, and by continually reading the indicator bits corresponding to the image input ports IN-1~IN-n, the image processing unit 104 further determines that the receiving unit 102 receives the image signal from the image input port IN-2, the image processing unit 104 controls the display unit 106 to display the image frame according to the image signal (i.e. the latest provided image signal) received from the image input port IN-2. In this way, it is unnecessary for the user to manually switch an image signal source, and convenience of using the display device is enhanced.

Figure 2A:
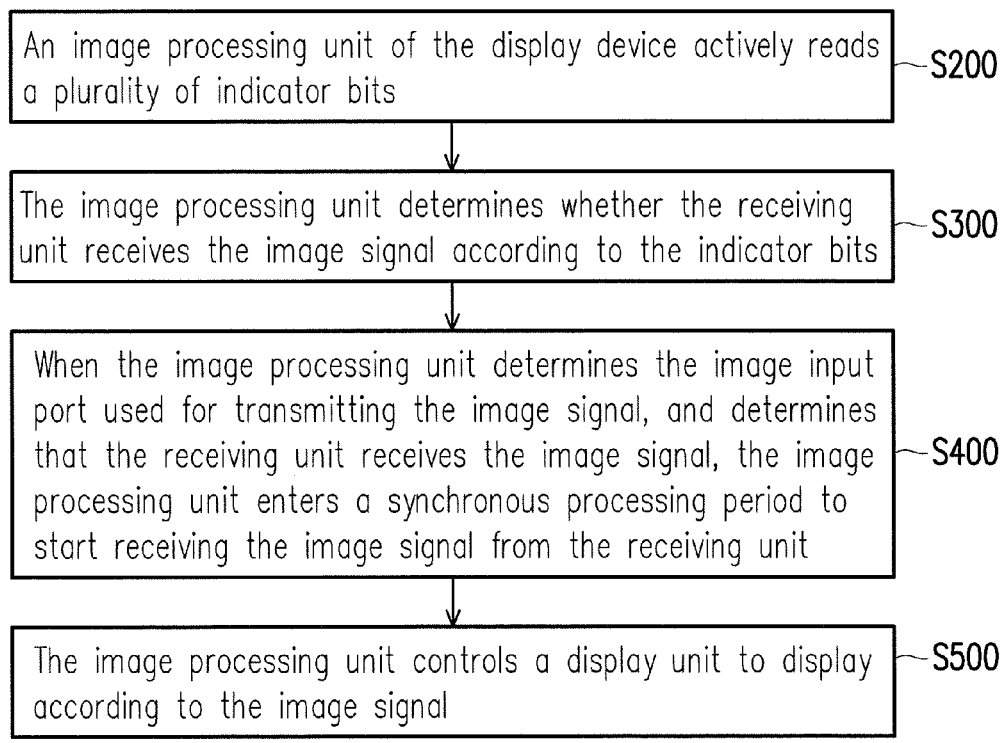
FIG. 2A, FIG. 2B and FIG. 3 are flowcharts illustrating display methods for a display device according to three embodiments of the invention.

FIG. 2A is a flowchart illustrating a display method for a display device according to an embodiment of the invention. Referring to FIG. 2A, the display method for the display device includes following steps. An image processing unit of the display device actively reads a plurality of indicator bits (step S200), where the indicator bits respectively correspond to a plurality of image input ports of the display device, and are stored in at least one register of a receiving unit of the display device, and the indicator bits indicate whether the receiving unit receives an image signal from the image input ports corresponding to the indicator bits. Then, the image processing unit determines whether the receiving unit receives the image signal according to the indicator bits (step S300). When the image processing unit determines the image input port used for transmitting the image signal to the receiving unit, and determines that the receiving unit receives the image signal, the image processing unit enters a synchronous processing period to start receiving the image signal from the receiving unit (step S400). Then, the image processing unit controls a display unit to display according to the image signal (step S500).

Figure 2B:
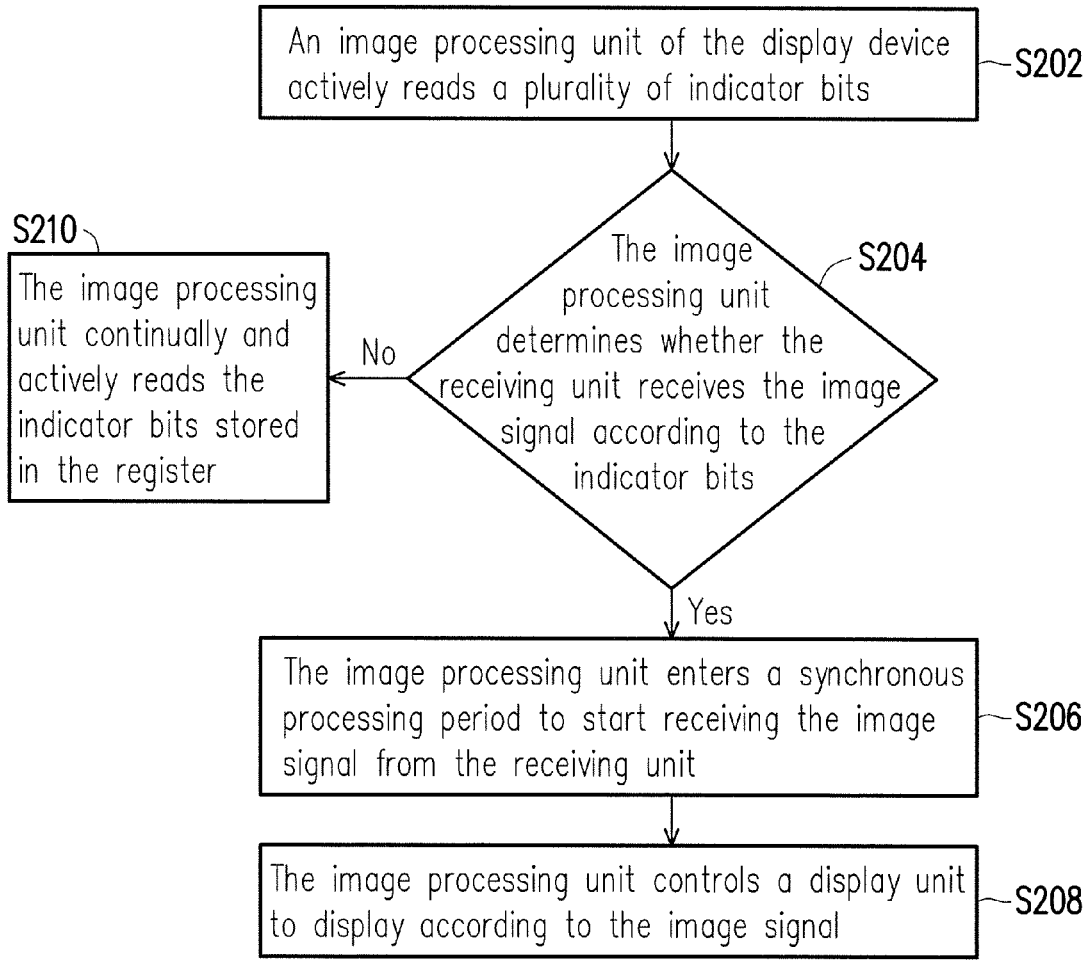

FIG. 2B is a flowchart illustrating a display method for a display device according to another embodiment of the invention. Referring to FIG. 2B, the display method for the display device includes following steps. An image processing unit of the display device actively reads a plurality of indicator bits (step S202), where the indicator bits respectively correspond to a plurality of image input ports of the display device, and are stored in at least one register of a receiving unit of the display device, and the indicator bits indicate whether the receiving unit receives an image signal from the image input ports corresponding to the indicator bits. Then, the image processing unit determines whether the receiving unit receives the image signal according to the indicator bits (step S204). When the image processing unit determines that the receiving unit receives the image signal according to the indicator bits, and determines the image input port used for transmitting the image signal to the receiving unit, the image processing unit enters a synchronous processing period to start receiving the image signal from the receiving unit (step S206). The image signal may includes a display image signal, a horizontal synchronous signal and a vertical synchronous signal, i.e. the image processing unit can receive the display image signal, the horizontal synchronous signal and the vertical synchronous signal of the image signal during the synchronous processing period. Then, the image processing unit controls a display unit to display according to the image signal (step S208). Conversely, in the step S204, when the image processing unit determines that the receiving unit does not receive the image signal, a step S210 is executed, by which the image processing unit continually and actively reads the indicator bits stored in the register. According to a currently read indicator bit, the image processing unit determines whether the image input port corresponding to the currently read indictor receives the image signal, and if the currently read indicator bit indicates that the image input port corresponding to the currently read indictor does not receive the image signal, the image processing unit reads another indicator bit, and determines whether the corresponding image input port receives the image signal. In this way, the indicator bits corresponding to each of the image input ports are continually read until it is determined that the receiving unit receives the image signal from the image input port, and the image display is performed according to the image signal.

Figure 3:
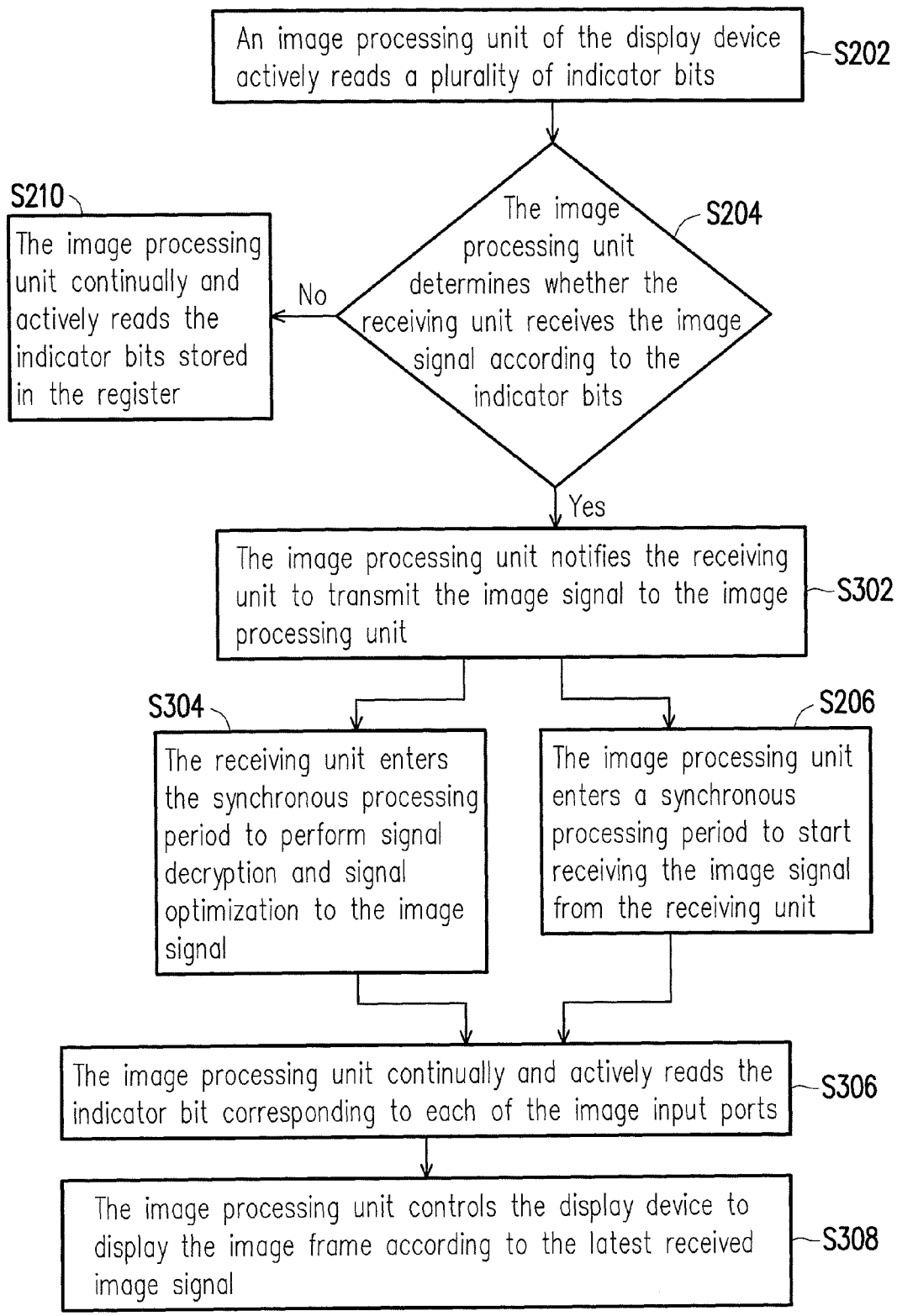

FIG. 3 is a flowchart illustrating a display method for a display device according to another embodiment of the invention. Referring to FIG. 3, the flow of the present embodiment is similar to the flow of FIG. 2, and a difference therebetween is that in the present embodiment, after the step S204 of determining whether the receiving unit receives the image signal, the image processing unit further notifies the receiving unit to transmits the image signal to the image processing unit (step S302), and then the step S206 is executed, In the step S206, the image processing unit enters the synchronous processing period to start receiving the image signal from the receiving unit. On the other hand, the receiving unit also enters the synchronous processing period together with the image processing unit, and the receiving unit performs, for example, signal decryption and signal optimization to the image signal (step S304). After the step S206 and the step S304, the image processing unit continually and actively reads the indicator bit corresponding to each of the image input ports (step S306), and controls the display device to display the image frame according to the latest received image signal (step S308). For example, when the image processing unit determines that a first image input port of the image input ports receives a first image signal at a first time, and determines that a second image input port of the image input ports receives a second image signal at a second time, the image processing unit controls the display unit to display the image frame according to the second image signal, where the second time is later than the first time.

In summary, the image processing unit of the embodiments of the invention actively reads the indicator bits stored in the receiving unit to determine whether the receiving unit receives the image signal from the image input port corresponding to the indicator bit. In the embodiment of the invention, when determining that the receiving unit receives the image signal, the image processing unit enters the synchronous processing period to start receiving the image signal from the receiving unit; and when determining that the receiving unit does not receive the image signal, the image processing unit can immediately determine whether the receiving unit receives the image signal from another image input port. In this way, the source of the image signal is quickly detected to display images, so as to improve convenience of using the display device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising:
a plurality of image input ports;
a receiving unit, coupled to the image input ports, and comprising at least one register, wherein the at least one register stores a plurality of indicator bits corresponding to the image input ports, the indicator bits are adapted to indicate whether the receiving unit receives an image signal from the image input ports corresponding to the indicator bits;
an image processing unit, coupled to the receiving unit, and adapted to actively read the indicator bits stored in the at least one register to determine whether the receiving unit receives the image signal, wherein when the image processing unit determines the image input port used for transmitting the image signal to the receiving unit, and determines that the receiving unit receives the image signal from the image input port corresponding to a currently read indicator bit of the indicator bits, the image processing unit and the receiving unit enter a synchronous processing period; and
a display unit, coupled to the processing unit, wherein during the synchronous processing period, an operation that the receiving unit performs signal decryption and/or signal optimization to the image signal from the image input port corresponding to the currently read indicator bit is synchronous to operations that the image processing unit receives the image signal from the image input port corresponding to the currently read indicator bit and controls the display unit to display according to the image signal.

2. The display device as claimed in claim 1, wherein when the image processing unit determines that the receiving unit does not receive the image signal from the image input port corresponding to a currently read indicator bit, the image processing unit continually and actively reads the indicator bits stored in the at least one register.

3. The display device as claimed in claim 1, wherein the image processing unit is adapted to determine whether the image input port corresponding to a currently read indicator bit receives the image signal according to the currently read indicator bit, and when the currently read indicator bit indicates that the image input port corresponding to the currently read indicator bit does not receive the image signal, the image processing unit determines whether the image input port corresponding to another indicator bit among the indicator bits receives the image signal according to the another indicator bit.

4. The display device as claimed in claim 1, wherein when the image processing unit determines that a first image input port of the image input ports receives a first image signal at a first time, and determines that a second image input port of the image input ports receives a second image signal at a second time, the image processing unit controls the display unit to display according to the second image signal, wherein the second time is later than the first time.

5. The display device as claimed in claim 1, wherein the image processing unit is adapted to notify the receiving unit to transmit the image signal to the image processing unit before the image processing unit receives the image signal during the synchronous processing period.

6. The display device as claimed in claim 1, wherein the image signal comprises a horizontal synchronous signal and a vertical synchronous signal, the image processing unit is adapted to receive the horizontal synchronous signal and the vertical synchronous signal during the synchronous processing period.

7. A display method for a display device, comprising:
actively reading a plurality of indicator bits by an image processing unit of the display device, wherein the indicator bits respectively correspond to a plurality of image input ports of the display device, and are stored in at least one register of a receiving unit of the display device, and the indicator bits indicate whether the receiving unit receives an image signal from the image input ports corresponding to the indicator bits;
determining whether the receiving unit receives the image signal from the image input port corresponding to a currently read indicator bit of the indicator bits by the image processing unit according to the indicator bits;
entering a synchronous processing period by the image processing unit and the receiving unit when the image processing unit determines the image input port used for transmitting the image signal to the receiving unit, and determines that the receiving unit receives the image signal;
during the synchronous processing period, synchronously performing signal decryption and/or signal optimization to the image signal from the image input port corresponding to the currently read indicator bit, receiving the image signal from the image input port corresponding to the currently read indicator bit, and controlling a display unit by the image processing unit to display according to the image signal.

8. The display method for the display device as claimed in claim 7, further comprising:
continually and actively reading the indicator bits stored in the at least one register when the image processing unit determines that the receiving unit does not receive the image signal from the image input port corresponding to a currently read indicator bit.

9. The display method for the display device as claimed in claim 7, further comprising:
determining by the image processing unit whether the image input port corresponding to a currently read indicator bit receives the image signal according to the currently read indicator bit; and
determining by the image processing unit whether the image input port corresponding to another indicator bit among the indicator bits receives the image signal according to the another indicator bit when the currently read indicator bit indicates that the image input port corresponding to the currently read indicator bit does not receive the image signal.

10. The display method for the display device as claimed in claim 7, further comprising:
controlling the display unit by the image processing unit to display according to a second image signal, when the image processing unit determines that a first image input port of the image input ports receives a first image signal at a first time, and determines that a second image input port of the image input ports receives the second image signal at a second time, wherein the second time is later than the first time.

11. The display method for the display device as claimed in claim 7, further comprising:
notifying the receiving unit to transmit the image signal to the image processing unit before the image processing unit receives the image signal during the synchronous processing period.

12. The display method for the display device as claimed in claim 7, further comprising:
receiving a horizontal synchronous signal and a vertical synchronous signal of the image signal by the image processing unit during the synchronous processing period.

* * * * *